(12) United States Patent
Zhou (10) Patent No.: US 10,913,478 B1
(45) Date of Patent: Feb. 9, 2021

(54) OUTDOOR STROLLER FOR CHILDREN

(71) Applicant: Xiying Zhou, Tongshan County, Hubei Province (CN)

(72) Inventor: Xiying Zhou, Tongshan County, Hubei Province (CN)

( * ) Notice: Subject to any disclaimer, the term of this patent is extended or adjusted under 35 U.S.C. 154(b) by 0 days.

(21) Appl. No.: 16/552,580

(22) Filed: Aug. 27, 2019

(51) Int. Cl.
*B62B 7/10* (2006.01)

(52) U.S. Cl.
CPC .................................. *B62B 7/105* (2013.01)

(58) Field of Classification Search
CPC .................................. B62B 7/062; B62B 7/10
USPC ........................................................ 280/642
See application file for complete search history.

(56) References Cited

U.S. PATENT DOCUMENTS

| | | | | |
|---|---|---|---|---|
| 3,075,783 A * | 1/1963 | Flam | .......................... | B62B 7/10 280/650 |
| 3,084,949 A * | 4/1963 | Forster | ...................... | B62B 7/10 280/650 |
| 4,335,900 A * | 6/1982 | Fleischer | ................ | B62B 7/083 280/649 |
| 4,746,140 A * | 5/1988 | Kassai | ....................... | B62B 7/08 108/173 |
| 4,858,947 A * | 8/1989 | Yee | ........................... | B62B 7/08 280/643 |
| 5,722,682 A * | 3/1998 | Wang | ........................ | B62B 7/06 280/642 |
| 6,095,548 A * | 8/2000 | Baechler | ................. | B62B 7/062 280/642 |
| 6,105,998 A * | 8/2000 | Baechler | ................. | B62B 7/062 280/47.38 |
| 6,676,140 B1 * | 1/2004 | Gondobintoro | ........... | B62B 7/08 280/33.993 |
| 6,755,435 B2 * | 6/2004 | Hsia | ........................ | B62B 7/083 280/47.38 |
| 6,935,652 B2 * | 8/2005 | Fair | ........................... | B62B 7/08 280/642 |
| 7,401,803 B1 * | 7/2008 | Lai | ............................ | B62B 7/08 280/47.38 |
| 7,464,957 B2 * | 12/2008 | Worth | ....................... | B62B 7/08 280/30 |
| 7,651,116 B2 * | 1/2010 | Hou | ......................... | B62B 7/086 280/642 |
| 7,766,368 B2 * | 8/2010 | Tsai | .......................... | B62B 7/08 280/649 |
| 7,878,515 B1 * | 2/2011 | Troup | ....................... | B62B 7/10 280/47.38 |
| 8,186,705 B2 * | 5/2012 | Greger | ................. | B60N 2/2821 280/643 |
| 8,322,745 B2 * | 12/2012 | Li | ............................ | B62B 7/08 280/642 |

(Continued)

*Primary Examiner* — Jeffrey J Restifo
(74) *Attorney, Agent, or Firm* — Muncy, Geissler, Olds & Lowe, P.C.

(57) ABSTRACT

An outdoor stroller for children is disclosed, including a top frame and a bottom frame which are frame units parallel to each other. An upper lateral bar is pivoted with a lower lateral bar which is crossed over and put upright with a crossbar in an X-shape. By the arrestment of a disengaging mechanism and a clamping device, the upper lateral bar and the lower lateral bar are formed into a straight bar to support and level the top frame parallel, thereby unfolding the stroller. On the other hand, the upper lateral bar and the lower lateral bar are turned backward, the top frame is lowered down parallel, and the lower lateral bar and the crossbar that are crossed over in the X-shape are folded with each other, so as to fold the stroller.

5 Claims, 12 Drawing Sheets

(56) References Cited

U.S. PATENT DOCUMENTS

| | | | |
|---|---|---|---|
| 8,328,208 B2 * | 12/2012 | Chen | B62B 7/145 280/47.38 |
| 8,366,141 B2 * | 2/2013 | Crisp | B62B 7/145 280/658 |
| 8,480,115 B2 * | 7/2013 | Chen | B62B 9/26 280/643 |
| 8,641,077 B2 * | 2/2014 | Conrad | B62B 7/008 280/642 |
| 8,646,802 B2 * | 2/2014 | Conrad | B62B 7/142 280/642 |
| 8,783,708 B2 * | 7/2014 | Storm | B62B 7/10 280/650 |
| 8,840,133 B2 * | 9/2014 | Li | B62B 7/10 280/650 |
| 8,894,090 B1 * | 11/2014 | Chen | B62B 7/068 280/647 |
| 8,905,428 B2 * | 12/2014 | Schroeder | B62B 7/08 280/650 |
| 8,915,516 B2 * | 12/2014 | Yang | B62B 9/28 280/642 |
| 8,919,809 B2 * | 12/2014 | Li | B62B 9/12 280/658 |
| 8,936,267 B2 * | 1/2015 | Li | B62B 7/08 280/642 |
| 8,998,241 B1 * | 4/2015 | Cheng | B62B 9/102 280/642 |
| 9,056,622 B2 * | 6/2015 | Thomas | B62B 7/04 |
| 9,221,487 B2 * | 12/2015 | Doucette | B62B 7/123 |
| 9,302,694 B2 * | 4/2016 | Velichko | B62B 7/12 |
| 9,796,405 B2 * | 10/2017 | Li | B62B 7/062 |
| 10,023,217 B2 * | 7/2018 | Sack | B62B 9/20 |
| 10,077,063 B2 * | 9/2018 | Haut | B62B 7/142 |
| 10,286,940 B2 * | 5/2019 | Chen | B62B 7/062 |
| 10,315,681 B2 * | 6/2019 | Pujol | B62B 7/06 |

\* cited by examiner

OUTDOOR STROLLER FOR CHILDREN

BACKGROUND OF THE INVENTION a) Field of the Invention

The present invention relates to an outdoor stroller for children, and more particularly to an outdoor stroller for children, wherein X-shaped crossbars are utilized to support a top frame (parallel frame unit) for unfolding the stroller. On the other hand, the top frame can be lowered down and the X-shaped crossbars are folded to collect the stroller. In addition, a disengaging mechanism and a clamping device for arrestment are used to unfold or fold the stroller. The present invention provides a large space to put a child and can be used as an outdoor stroller or a playpen.

b) Description of the Prior Art

It is known that a conventional baby playpen can provide for the sleeping, playing and doing activities of a baby, avoiding an accident by the crawling of baby. This baby playpen facilitates a caretaker to take care of the baby and is also a necessity for a user with children. Most of the existing baby playpens can be folded to facilitate collection. Furthermore, a child stroller is also indispensable for the caretaker as he or she may need to take the child out. The child stroller facilitates the caretaker to put the baby in the stroller and to push it outdoors, so that the baby can get in touch with outdoor environment and can be carried easily. Therefore, the child stroller is a must for ordinary parents and caretakers, providing great convenience without the inconvenience in holding the baby by hands. In addition, by pushing the stroller, the parents and the caretakers can save energy without holding the baby for a long time. The conventional outdoor stroller for children is primarily composed of plural bars and a soft seat cushion. The bars are usually equipped with complicated kits and can be expanded to support the seat cushion. Besides, the bars can be folded into an upright configuration to reduce size for easy carrying.

However, as the parents will have to purchase both of the abovementioned apparatuses for children, the costs will be increased and the parents and caretakers will be very exhausted due to the need for unfolding and folding these two kinds of apparatuses constantly to meet the requirements for living a home life and going outdoor.

SUMMARY OF THE INVENTION

The conventional child stroller can be folded. However, as the sitting space for the child is small, the stroller cannot be used as a playpen that one cannot use it in both ways. Moreover, whether the playpen or the stroller, it is provided with a complicated folding structure, which annoys the operation of a caretaker.

Accordingly, the present invention provides an outdoor stroller for children, comprising a handle grip, two upper lateral bars, two lower lateral bars and two crossbars. The handle grip provides for holding and pushing the stroller by hands. The two upper lateral bars are pivoted respectively with an end of the handle grip, and the upper lateral bar is provided with a disengaging mechanism. The two lower lateral bars are pivoted respectively with a lower end of the upper lateral bar, and a bottom end of each lower lateral bar is provided with a front wheel. The two crossbars are pivoted respectively with a lower lateral bar at about the middle location, the crossbars and the lower lateral bars are pivoted together in an X-shape, and each crossbar is pivoted with a rear wheel.

The bottom ends of two lower lateral bars are connected with a bottom frame, and the top ends of two crossbars are connected with a top frame; whereas a clamping device, which is a pivoting unit, is disposed at a location where a lower lateral bar is pivoted with the lower end of an upper lateral bar. The pivoting unit is provided with a slot, and the upper lateral bar is provided with a flapper which can be latched into the slot and can escape from the slot by the disengaging mechanism.

Accordingly, when the flapper of the upper lateral bar is latched into the slot so that the upper lateral bars and the lower lateral bars can form straight bars, and the lower lateral bars and the crossbars are crossed over and put upright, the top frame can be supported and leveled for unfolding. On the other hand, after actuating the disengaging mechanism, the flapper escapes from the slot, the upper lateral bar turns forward against the pivoting unit, the lower lateral bars and the crossbars, which are crossed over in the X-shape, are folded together, and the top frame is lowered down to approach the bottom frame, thereby forming a folding state.

A primary object of the present invention is to provide an outdoor stroller for children, wherein the top frame and the bottom frame are frames parallel to each other, the lower lateral bars and the crossbars are crossed over in the X-shape and put upright to level the top frame parallel, thereby unfolding the stroller. On the other hand, the top frame is lowered down parallel to approach the bottom frame, whereas the lower lateral bars and the crossbars, which are crossed over in the X-shape, are folded together to collect the stroller.

Another object of the present invention is to provide an outdoor stroller for children, wherein as the top frame and the bottom frame are parallel to each other, the interior activity space after unfolding is large, allowing the stroller to be used as a child stroller as well as a playpen.

Still another object of the present invention is to provide an outdoor stroller for children, wherein the stroller facilitates the carrying and unfolding operation, and the folding is executed only by pulling up a pull handle, without using a complicated structure that is difficult in operation, which is even more convenient for a baby caretaker.

To enable a further understanding of the said objectives and the technological methods of the invention herein, the brief description of the drawings below is followed by the detailed description of the preferred embodiments.

DETAILED DESCRIPTION OF THE PREFERRED EMBODIMENTS

Figure 1:
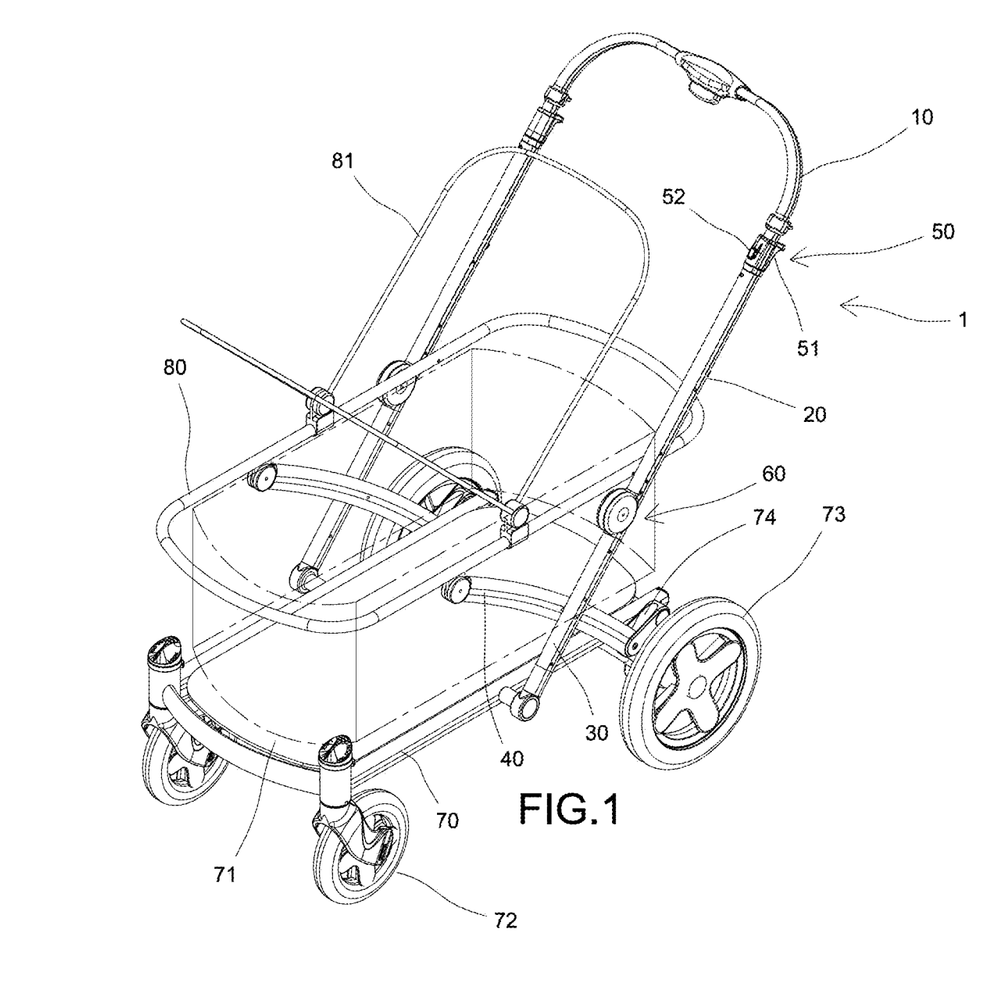
FIG. 1 shows a three-dimensional assembly view of the present invention.
Figure 2:
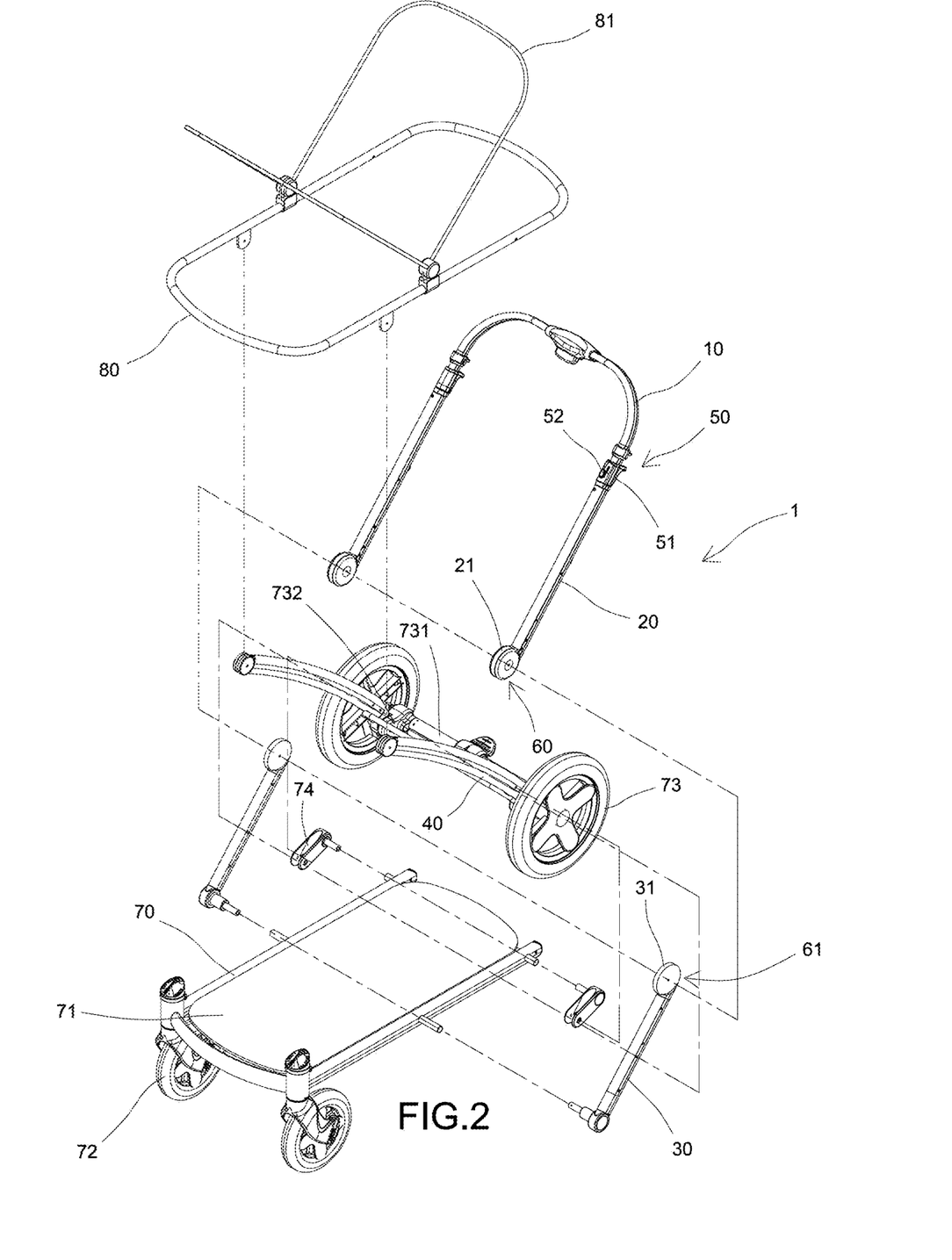
FIG. 2 shows a three-dimensional exploded view of the present invention.
Figure 3:
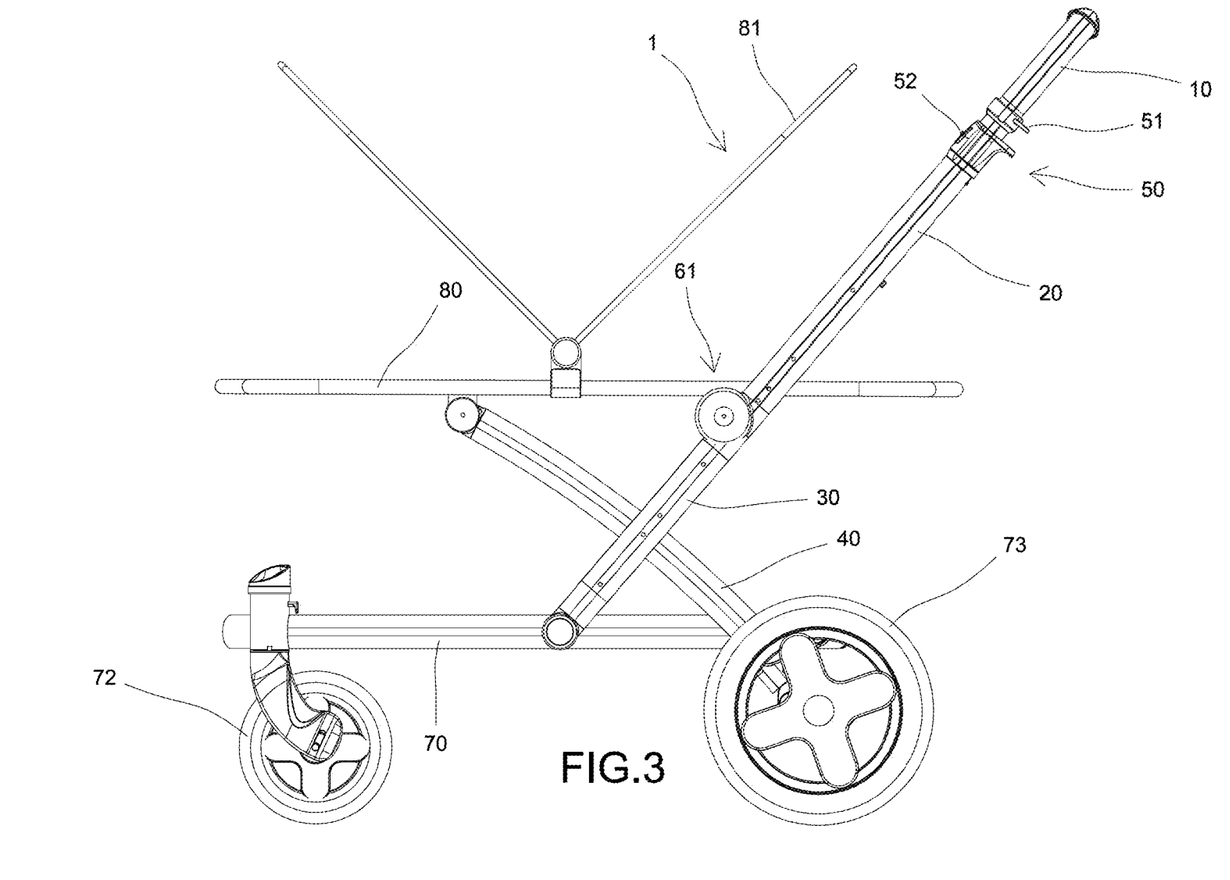
FIG. 3 shows a plan view of the present invention after unfolding.
Figure 4:
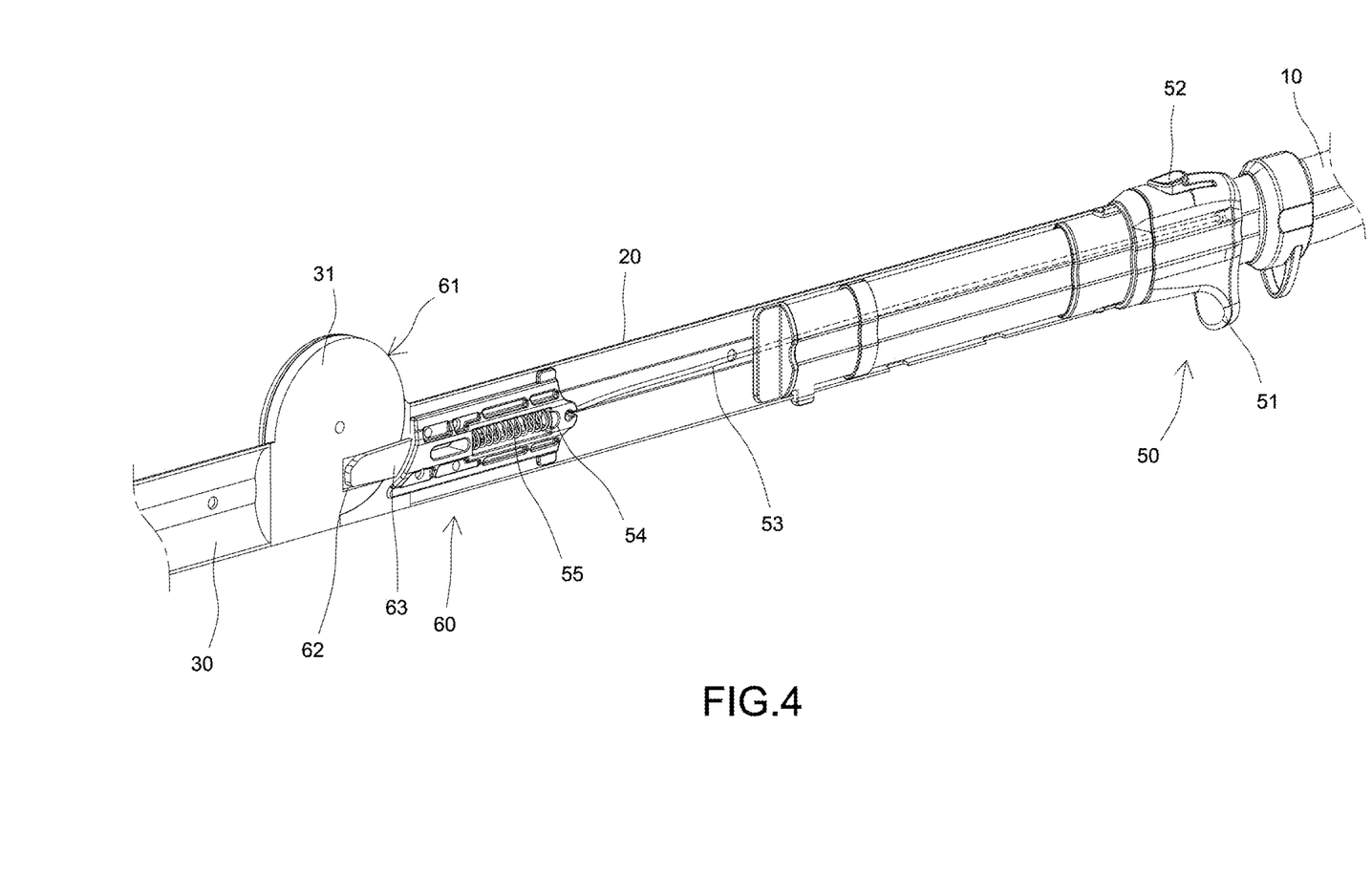
FIG. 4 shows a three-dimensional cutaway view of a clamping device, according to the present invention.
Figure 5:
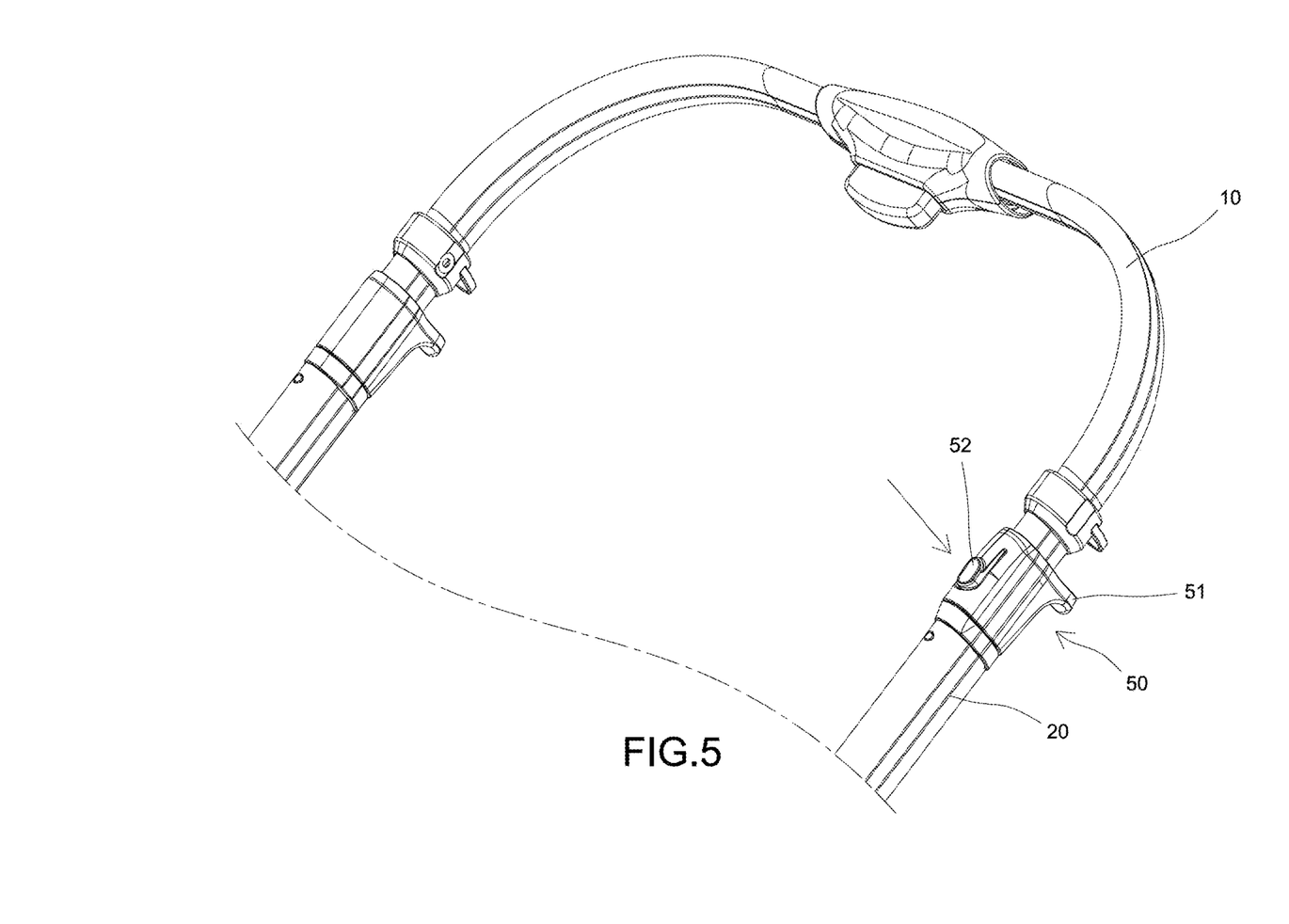
FIG. 5 shows a three-dimensional view of a handle grip and two upper lateral bars, according to the present invention.
Figure 6:
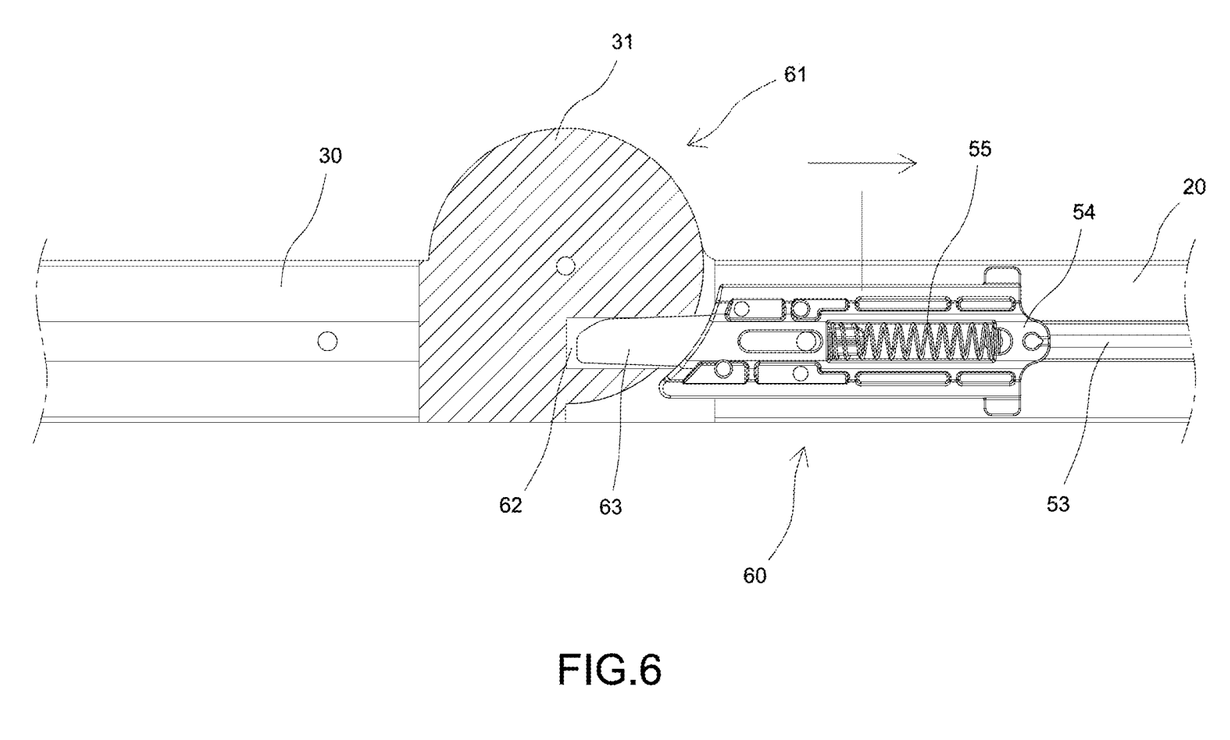
FIG. 6 shows a cutaway view of a clamping state of the clamping device, according to the present invention.
Figure 7:
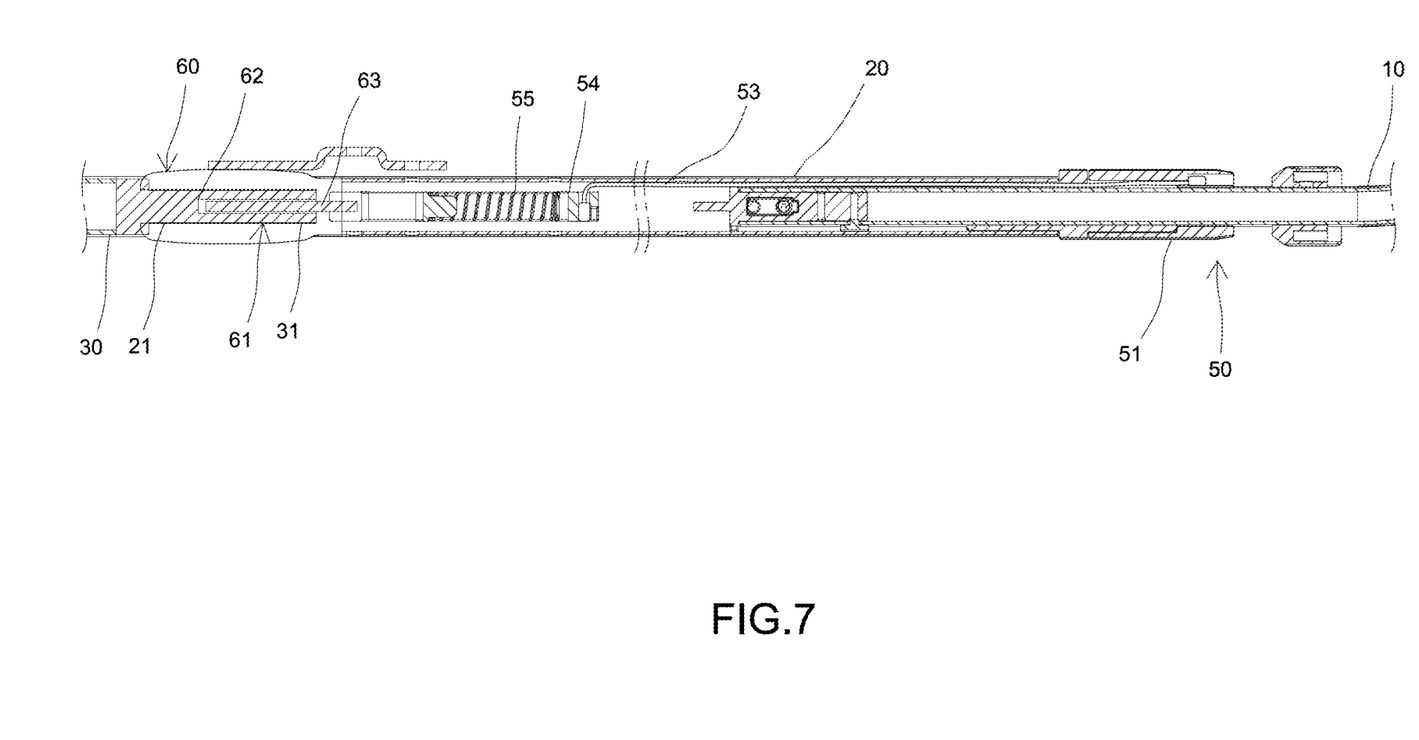
FIG. 7 shows a cutaway view of an upper lateral bar and a lower lateral bar, according to the present invention.
Figure 8:
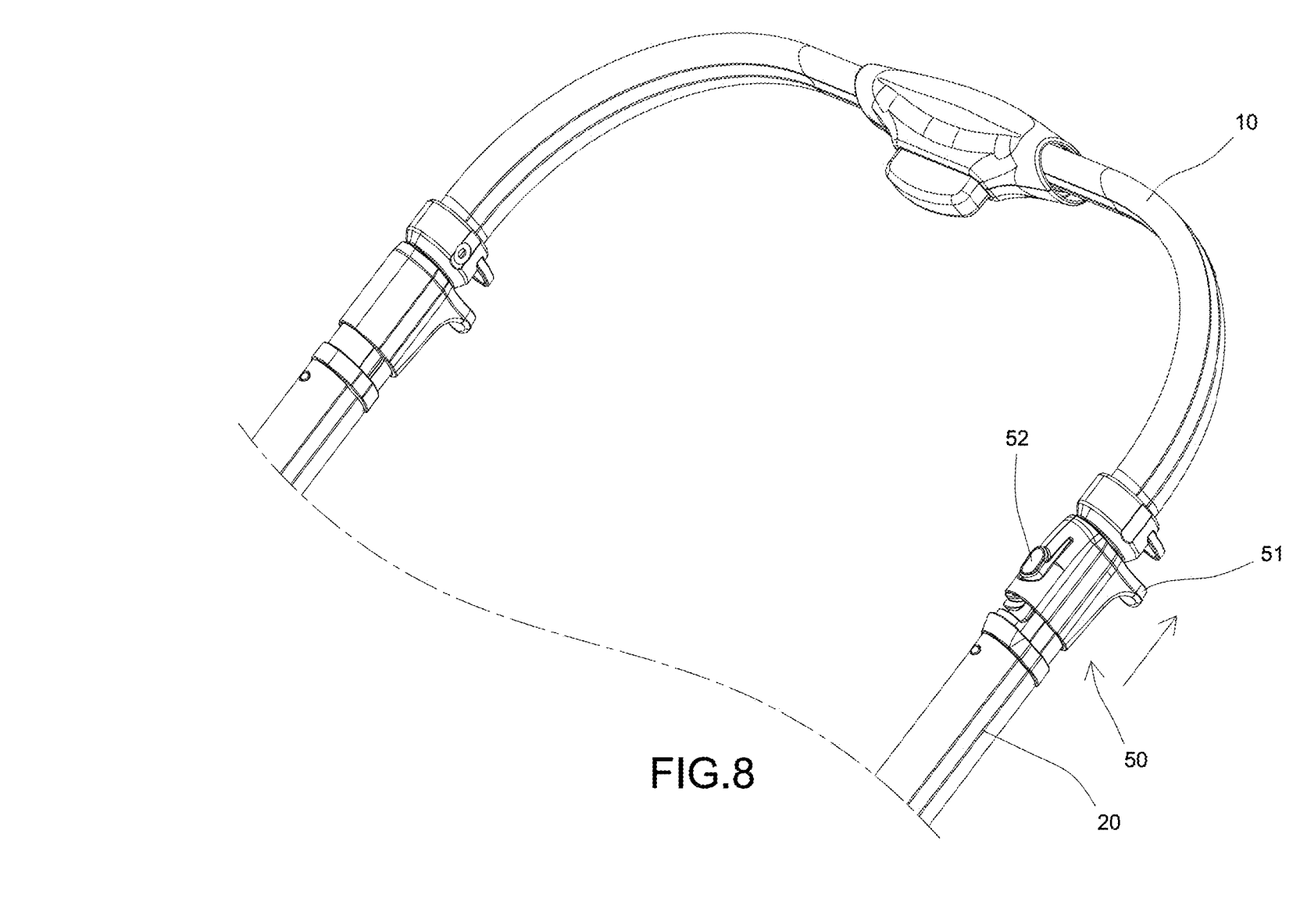
FIG. 8 shows a three-dimensional view of an operation in pulling up the handle grip, according to the present invention.
Figure 9:
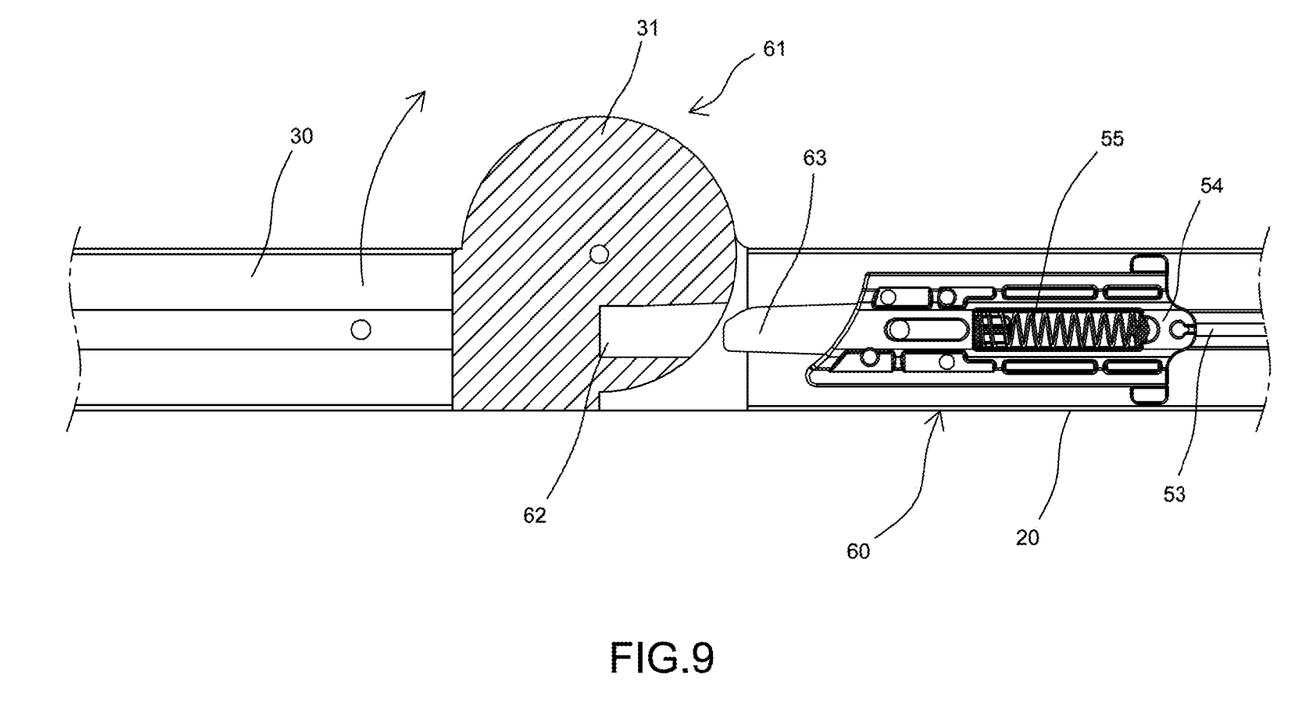
FIG. 9 shows a cutaway view of an escaping state of the clamping device, according to the present invention.
Figure 10:
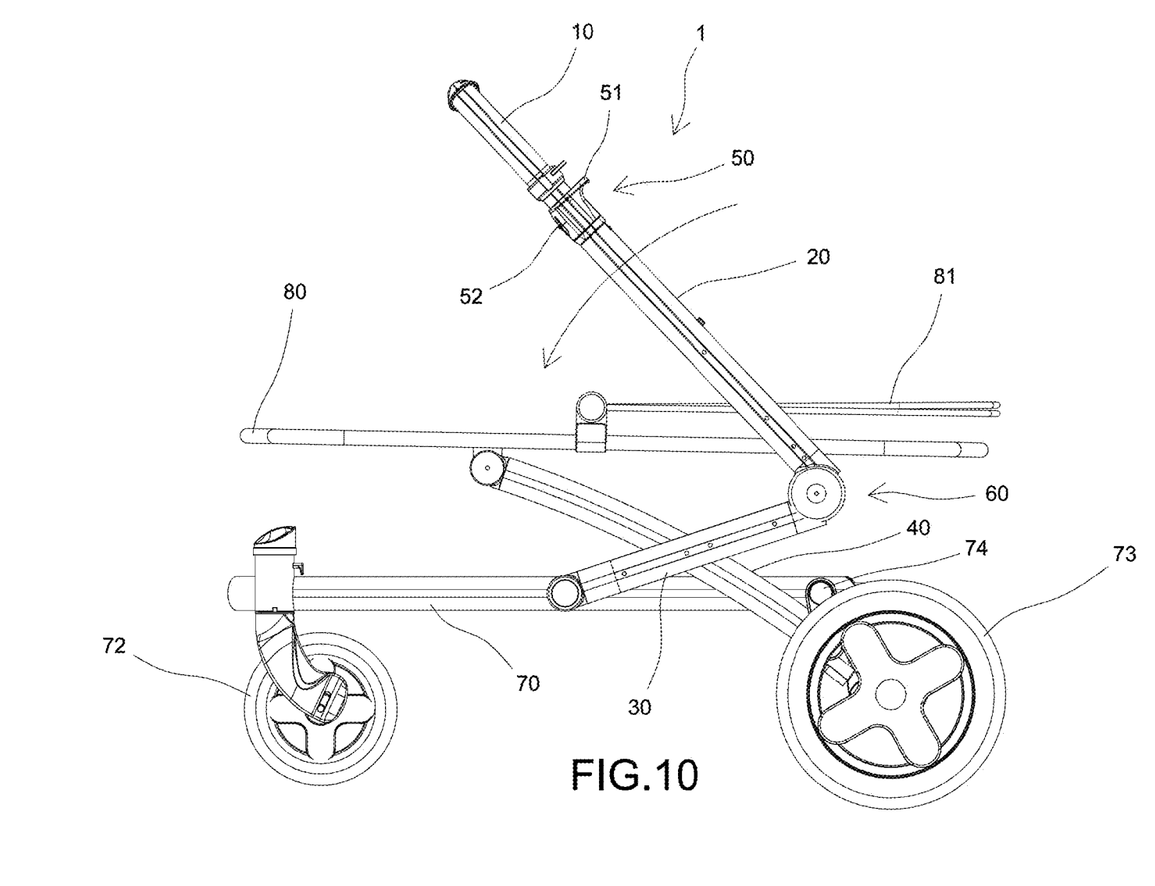
FIG. 10 shows a plan view of operation in folding a stroller gradually, according to the present invention.
Figure 11:
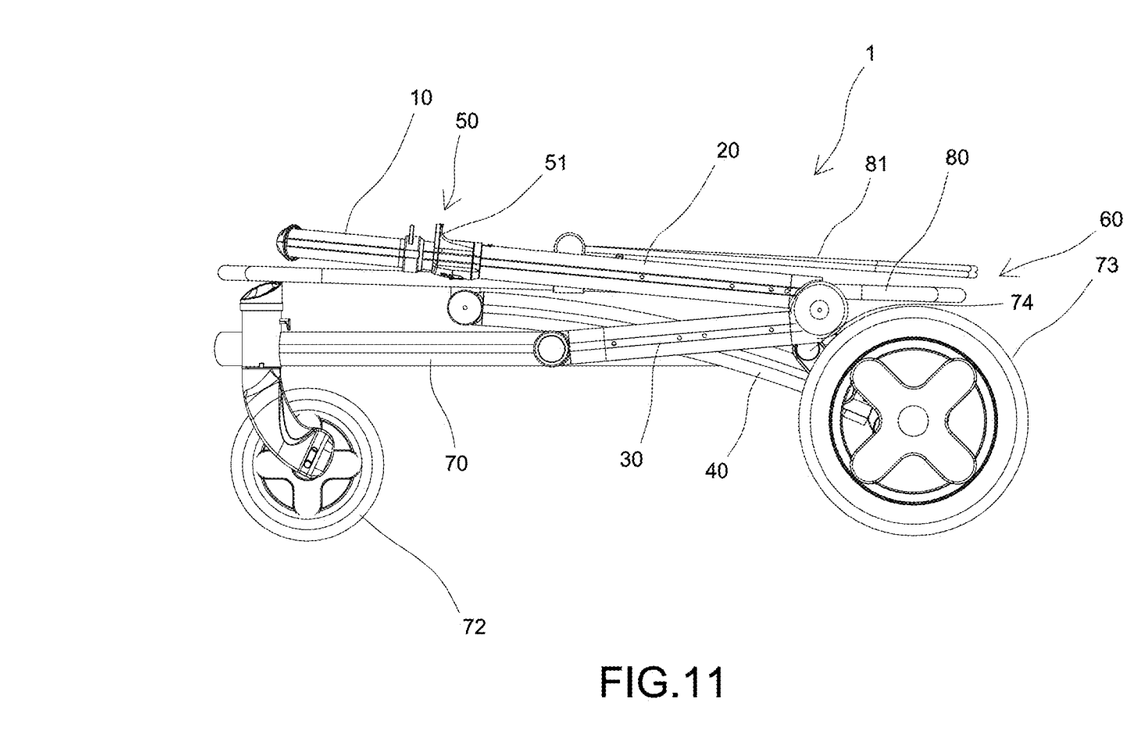
FIG. 11 shows a plan view of the stroller which is already folded, according to the present invention.
Figure 12:
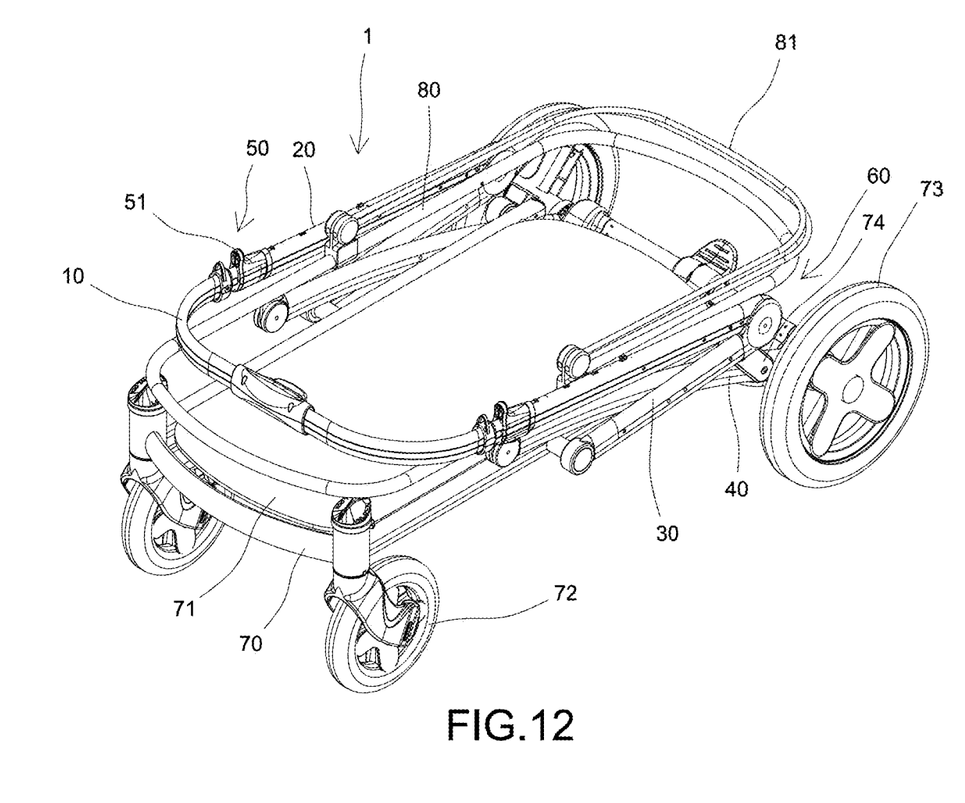
FIG. 12 shows a three-dimensional view of the stroller which is already folded, according to the present invention.

Referring to FIGS. 1 to 3, the present invention discloses an outdoor stroller 1 for children, comprising a handle grip 10, two upper lateral bars 20, two lower lateral bars 30, two crossbars 40, a disengaging mechanism 50 and a clamping device 60. The handle grip 10 is an reversed U-shaped bar for holding and pushing the stroller 1 by hands. Two lower ends of the handle grip 10 are pivoted with the upper lateral bars 20. One upper lateral bar 20 is provided with the disengaging mechanism 50. Two lower lateral bars 30 are pivoted respectively with a lower end of the upper lateral bar 20, and bottom ends of the two lower lateral bars 30 are connected to a bottom frame 70. The bottom frame 70 is a U-shaped frame, an interior of the bottom frame 70 is a bottom plate 71, two front ends of the bottom frame 70 are pivoted respectively with a front wheel 72, and two rear ends of the bottom frame 70 are pivoted respectively with a buffer block 74. A shaft 731 is disposed between the two rear wheels 73, and two sides of the shaft 731 are provided respectively with a pivoting block 732. The other end of the buffer block 74 is pivoted with the pivoting block 732, and the buffer block 74 is used to mitigate the vibration from two rear wheels 73 and the downward pressure from the shaft 731. The clamping device 60 is disposed at a location where the lower lateral bar 30 is pivoted with a lower end of the upper lateral bar 20 (as shown in FIGS. 4, 6 and 7). Two crossbars 40 are pivoted respectively with the lower lateral bar 30 at about the middle location, the crossbar 40 can be pivoted with the lower lateral bar 30 in an X-shape, and the two crossbars 40 are connected with a top frame 80. The top frame 80 is a nearly rectangular frame unit and can provide for sheathing with cloth. The top frame 80 can be pivoted with two arc-shaped bars 81 to support a sun canopy (not shown in the drawings). The two arc-shaped bars 81 can be expanded into a V-shape and can be also folded backward to be attached on the top frame 80. The clamping device 60 is a pivoting unit 61 and is disposed at a location where the lower lateral bar 30 is pivoted with the lower end of the upper lateral bar 20. An interior of the pivoting unit 61 is provided with a slot 62. One upper lateral bar 20 is provided with a flapper 63 (as shown in FIGS. 4 and 6), the flapper 63 can be latched into the slot 62, and can escape from the slot 62 by the driving of the disengaging mechanism 50. The lower end of the upper lateral bar 20 is provided with a pivoting indentation member 21, a top end of the lower lateral bar 30 is provided with a flat disc 31, and the flat disc 31 is put into the pivoting indentation member 21 (as shown in FIG. 2 and FIG. 7). The pivoting indentation member 21 is a gap formed between the two flat discs 31. Referring to FIGS. 4, 5, 7 and 8, one upper lateral bar 20 is provided with a pull handle 51, a push button 52, a rope 53 (steel wire), a pull frame 54 and a spring 55. The pull handle 51 is sheathed on the upper end of the upper lateral bar 20, and is provided with the push button 52. An interior of the push button 52 is provided with a small spring (not shown in the drawings) to restore the push button 52. Pressing down the push button 52 allows the pull handle 51 to move upward without stopping. The pull handle 51 draws the rope 53, and the rope 53 drives the pull frame 54. The spring 55 is disposed in the pull frame 54, an end of the spring 55 is positioned in the upper lateral bar 20, and the other end of the spring 55 is abutted at the pull frame 54. An exterior of the pull frame 54 is provided with the flapper 63. After pulling up the pull handle 51, the rope 53 will draw the pull frame 54 and the flapper 63, and the flapper 63 will escape from the slot 62.

By the assembly of abovementioned structures and referring to FIGS. 8, 9, 10, 11 and 12, upon folding the stroller, the push button 52 on the upper end of the upper lateral bar 20 is pressed down. As the push button 52 will not block the pull handle 51, the pull handle 51 can be pulled upward to draw the interior rope 53. The rope 53 will then drive the pull frame 54 which drives the flapper 63 to escape from the slot 62. The upper lateral bars 20 can be then turned forward against the pivoting unit 61. As the upper lateral bars 20 are disposed on the top frame 80 parallel, the lower lateral bars 30 and the crossbars 40 that are crossed over in the X-shape can be folded together, with the angle in X-shaped crossing being changed from small to large. The top frame 80 is then lowered down parallel to approach the bottom frame 70, thereby accomplishing the folding of stroller 1. On the other hand, when unfolding the stroller 1, the upper lateral bars 20 and the handle grip 10, which are originally disposed above the top frame 80 parallel, are turned backward against the pivoting unit 61 (turning upward to open), until the flapper 63 of the clamping device 60 is latched into the slot 62 of the pivoting unit 61. The other end of the spring 55 is abutted at the pull frame 54 and at this time, the pull frame 54 will latch the flapper 63 into the slot 62 by the elastic force of abutting from the spring 55. In the meantime, the pull frame 54 will also drive the pull handle 51 to restore downward through the rope 53, so that the pull handle 51 can be disposed at a distance a little downward from the top end of the upper lateral bar 20. The push button 52 will then be bounced upward to restore. After the flapper 63 of the upper lateral bar 20 is latched into the slot 62, the upper lateral bars 20 and the lower lateral bars 30 are formed into straight bars, and the lower lateral bars 30 and the crossbars 40 are crossed over, with the angle in X-shape crossing being changed from large to small. Therefore, the top frame 80 can be supported and leveled parallel to move away from the bottom frame 70, thereby unfolding the stroller 1.

The handle grip 10 can be extended into the upper lateral bars 20. As this belongs to a conventional clamping device with steel shots, no further description is provided. The present invention can be used as an outdoor stroller for children. As the top frame 80 and the bottom frame 70 are parallel to each other, the interior space of activity is large after unfolding, and the present invention can be also used as a playpen. In addition, the present invention can be carried and unfolded conveniently, and the user can just pull up the pull handle 51 for folding, without using a complicated structure that are difficult in operation, which even facilitates the baby caretaker.

It is of course to be understood that the embodiments described herein is merely illustrative of the principles of the invention and that a wide variety of modifications thereto may be effected by persons skilled in the art without departing from the spirit and scope of the invention as set forth in the following claims.

What is claimed is:

1. An outdoor stroller for children, comprising
a handle grip which provides for holding and pushing the stroller by hands;
two upper lateral bars which are pivoted respectively with an end of the handle grip, with one upper lateral bar being provided with a disengaging mechanism;
two lower lateral bars which are pivoted respectively with a lower end of the upper lateral bar, with a bottom of each lower lateral bar being connected with a front wheel; and
two crossbars which are pivoted respectively with the lower lateral bar at about the middle location, with the crossbars and the lower lateral bars being pivoted together in an X-shape, and the crossbars being pivoted respectively with a rear wheel;
wherein bottom ends of the two lower lateral bars are connected with a bottom frame, top ends of the two crossbars are connected with a top frame, a clamping device being a pivoting unit which is disposed at a location where the lower lateral bar is pivoted with the lower end of the upper lateral bar, an interior of the pivoting unit is provided with a slot, the upper lateral bar is provided with a flapper, the flapper is latched into the slot and escapes from the slot by the disengaging mechanism;
accordingly, the flapper of the upper lateral bar is latched into the slot, allowing the upper lateral bars and the lower lateral bars to form straight bars; the lower lateral bar and the crossbar is crossed over and put upright to level the top frame, thereby unfolding the stroller; after actuating the disengaging mechanism, the flapper escapes from the slot, the upper lateral bars turn forward against the pivoting unit, the lower lateral bar and the crossbar that are crossed over in the X-shape are folded with each other, and the top frame is lowered down to approach the bottom frame, thereby folding the stroller.

2. The outdoor stroller for children, according to claim 1, wherein one upper lateral bar is provided with a pull handle, a push button, a rope, a pull frame and a spring, with that the pull handle is sheathed on an upper end of the upper lateral bar, the push button blocks the pull handle, the pull handle drives the rope, the rope draws the pull frame, the spring is disposed in the pull frame, an end of the spring is positioned in the upper lateral bar, the other end of the spring is abutted at the pull frame, and an exterior of the pull frame is a flapper; after pulling up the pull handle, the rope draws the pull frame and the flapper, enabling the flapper to escape from the slot.

3. The outdoor stroller for children, according to claim 1, wherein a lower end of the upper lateral bar is provided with a pivoting indentation member, a top end of the lower lateral bar is provided with a flat disc which is put into the pivoting indentation member, and the pivoting indentation member is a gap formed between the two flat discs.

4. The outdoor stroller for children, according to claim 1, wherein the top frame is a nearly rectangular frame unit which is pivoted with two arc-shaped bars to support a sun canopy.

5. The outdoor stroller for children, according to claim 1, wherein the bottom frame is an U-shaped frame unit, an interior of the bottom frame is provided with a bottom plate, two front ends of the bottom frame are pivoted respectively with a front wheel, two rear ends of the bottom frame are pivoted respectively with a buffer block, a shaft is disposed between the two rear wheels, each side of the shaft is provided with a pivoting block, and the other end of the buffer block is pivoted with the pivoting block.

* * * * *